US005808916A

United States Patent [19]
Orr et al.

[11] Patent Number: 5,808,916
[45] Date of Patent: *Sep. 15, 1998

[54] METHOD FOR MONITORING THE ENVIRONMENT

[75] Inventors: Wilson W. Orr, Mayer; Raymond M. P. Miller, Scottsdale, both of Ariz.

[73] Assignee: City of Scottsdale, Scottsdale, Ariz.

[*] Notice: The term of this patent shall not extend beyond the expiration date of Pat. No. 5,652,717.

[21] Appl. No.: 900,530

[22] Filed: Jul. 25, 1997

Related U.S. Application Data

[63] Continuation-in-part of Ser. No. 735,336, Oct. 22, 1996, Pat. No. 5,652,717, which is a continuation of Ser. No. 285,830, Aug. 4, 1994, abandoned.

[51] Int. Cl.$^6$ ................................................. G06T 17/50
[52] U.S. Cl. ........................................... 364/578; 395/930
[58] Field of Search ..................................... 364/578, 564, 364/512, 413.3; 395/920, 930; 324/323; 422/900

[56] References Cited

U.S. PATENT DOCUMENTS

| | | | |
|---|---|---|---|
| 4,868,771 | 9/1989 | Quick et al. | 364/578 |
| 4,890,249 | 12/1989 | Yen | 364/578 |
| 5,005,147 | 4/1991 | Krishen et al. | 364/578 |
| 5,307,292 | 4/1994 | Brown | 364/564 |
| 5,329,464 | 7/1994 | Sumic et al. | 364/512 |
| 5,375,074 | 12/1994 | Greenberg et al. | 364/578 |

OTHER PUBLICATIONS

"A Three–Dimensional/Stereoscopic Display and Model Control System for Great Lakes Forecasts", by C. Yen, K. Bedford, J. Kempf and R. Marshall, IEEE Visualization Conference, 1990, pp. 194–201.

"Visualizing n–Dimensional implications of Two–Dimensional design Decisions", by S. Ervin, IEEE Visualization Conference, 1992, pp. 356–360.

"Computer–Aided Modeling for Interference Analysis in Urban Areas", By T. Mizuike et al, Globecom '92: IEEE Glogal Telecommunications Conference, 1992, pp. 1858–1864.

"Machine Learning from Remote Sensing Analysis", by D. Charebois, D. Goodenough and S. Matwin, IEEE, Remote Sensing for the Nineties, 1993 (IGARSS), pp. 165–172.

"ADSM–An Automated Distribution System Modeling Tool for Engineering Analyses", by X. Wei, Z. Sumic and S. Venkata, IEEE Transmission and Distribution Conference, 1994, pp. 46–52.

"Geographic Information Systems: Are They Decision Support Systems?", by. L. Murphy, IEEE, System Sciences, 1995 Annual Hawaii Int'l Conference, vol. IV, pp. 131–140.

*Primary Examiner*—Kevin J. Teska
*Assistant Examiner*—Russell W. Frejd
*Attorney, Agent, or Firm*—Cahill, Sutton & Thomas P.L.C.

[57] ABSTRACT

A method for monitoring the environment is described which is capable of providing projected results and effects based upon varying the inputted data as a function of the consequences of presently made or proposed decisions by decisionmakers. Sources of data collected from a plurality of sources are converted into an electronic database which may be automatically and/or periodically updated. A series of software modules utilize the data for a series of to-be-defined specific applications. To portray the environment at a specified future date, the methodology utilizes the full capabilities and data resident in the database. The output provided by modeling and simulation modules may be in the form of two- or three-dimensional visual presentations in an especially equipped multiple, computer-driven, projector screen room or may be in the form of a printed media for binding and distribution with screen images combined with text.

24 Claims, 4 Drawing Sheets

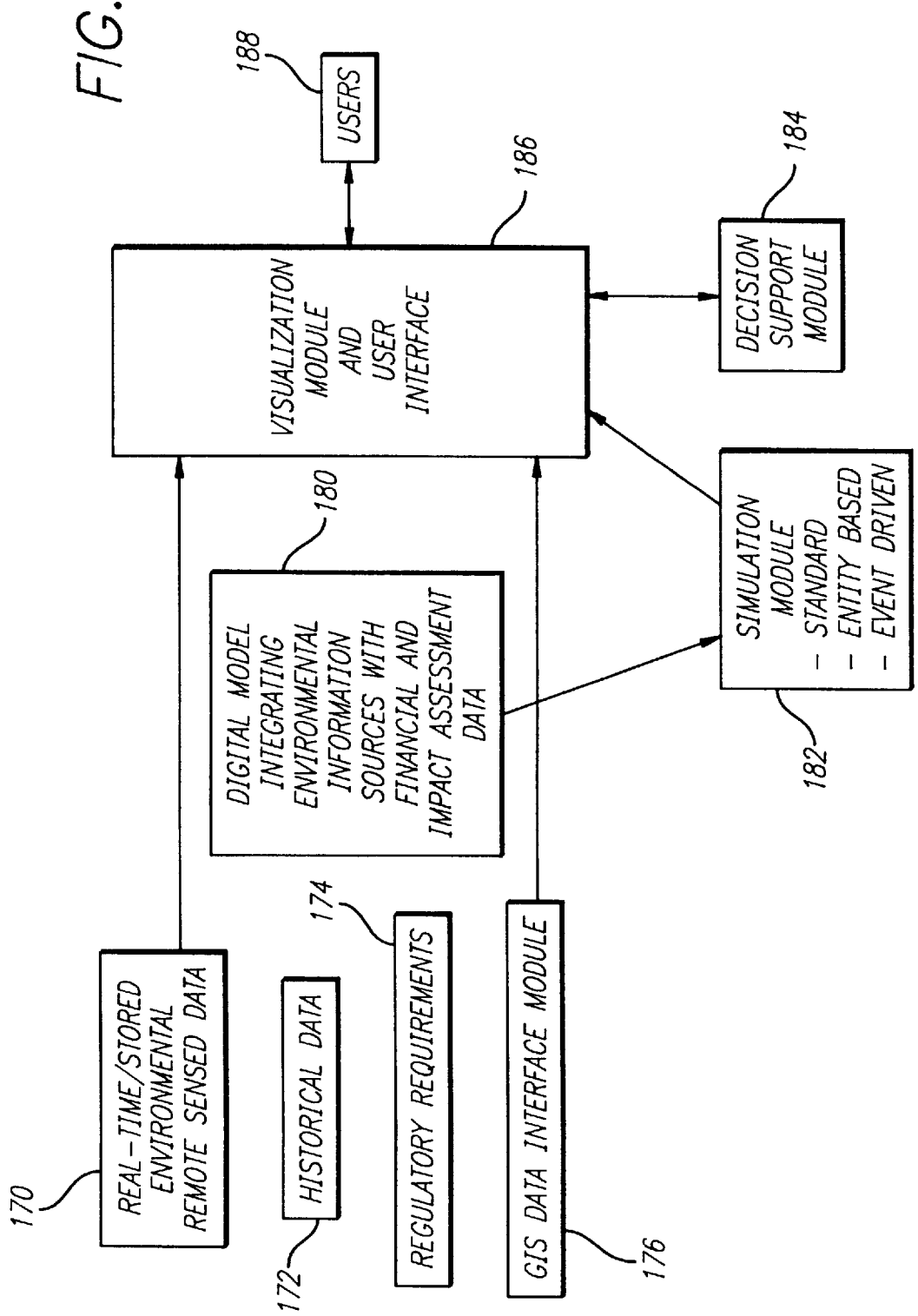

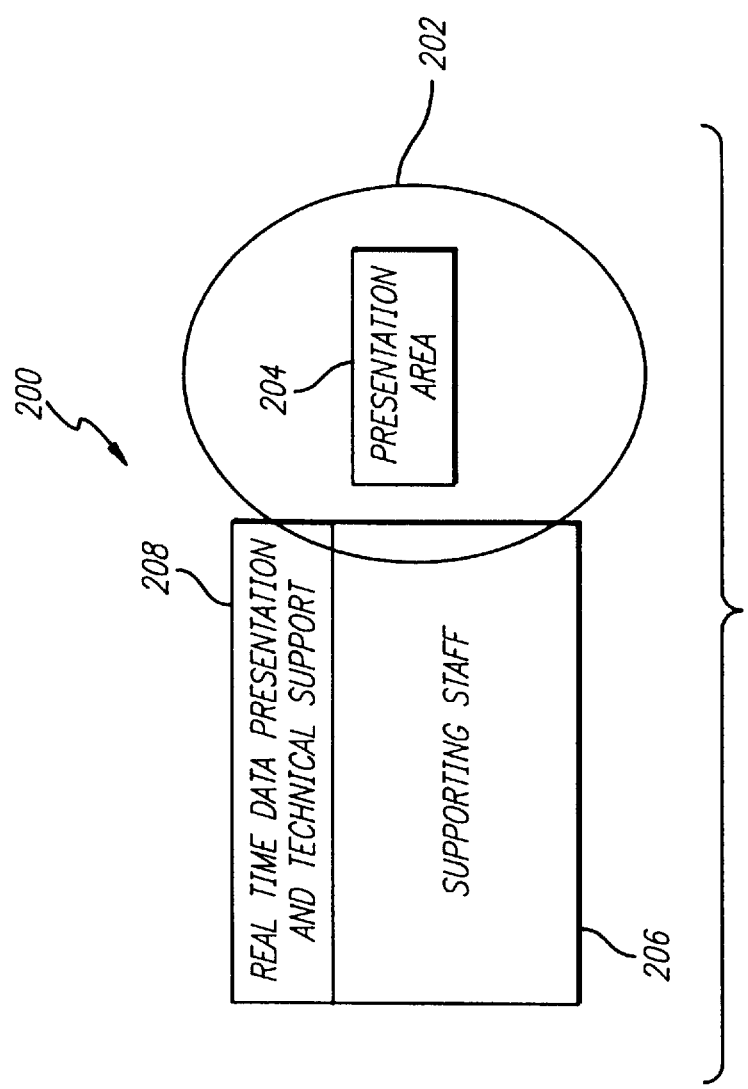

METHOD FOR MONITORING THE ENVIRONMENT

CROSS-REFERENCE TO RELATED APPLICATIONS

The present application is a continuation-in-part application of an application entitled "APPARATUS AND METHOD FOR COLLECTING, ANALYZING AND PRESENTING GEOGRAPHICAL INFORMATION", filed Oct. 22, 1996 and assigned Ser. No. 08/735,336, now U.S. Pat. No. 5,652,717 issued Jul. 29, 1997, which is a continuation of application Ser. No. 08/285,830, filed Aug. 4, 1994, now abandoned, and describing an invention of the present inventors.

BACKGROUND OF THE INVENTION

1. Field of the Invention

The present invention relates to the collection, integration, manipulation, modeling, and presentation of various local, regional, and/or global data relating to the environment and, more particularly, to a method for generating various models of the environment and each of their impacts upon health and fiscal considerations.

2. Description of Related Art

Environmental concerns are relatively new to local and regional jurisdictions. To date, the gathering of data relating to the environment is largely manual and trend analysis is usually derived by extrapolation. The questionable accuracy of such data and analysis can contribute to creation of gross errors. These errors can cause unnecessary and very costly remediation expenses or can result in enormous health costs. Local government officials that use the available environmental data within existing analysis procedures cannot provide concise presentations due to the poor fit between the available data and the decisionmaking processes. Moreover, inter-relationships between multiple environmental factors and secondary aspects of costs and ultimate environmental impacts are too complex for current procedures to permit accurate and understandable conclusions for review by decisionmakers within the jurisdiction. To date, the synthesis of data into rational data bases and correlation of such data with financial data has been essentially a manual process with some help from spreadsheet analysis. The resulting models are elementary and lack the dynamics of integrated components and a robust visually perceivable image or output. The financial costs are elusive and difficult to discount to net present values as they are derived from multiple disciplines and usually account to future generations. As a result, the lack of specific justifiable and predictable models results in heated public debates with regard to management of local and regional environmental assets. As public health is also at risk and has a long term effect upon taxpayer resources, the public is poorly served by current environmental monitoring efforts in communities that are increasingly polluted.

SUMMARY OF THE INVENTION

The present invention is directed to an advanced remote sensing and environmental monitoring system which rapidly acquires broad-based and accurate environmental data necessary to support a cost-effective decision and management process. Remote sensing capabilities are used to search for specific spectral emissions indicating human, animal, or natural (vegetative, weather, etc.) activities. Data attendant these activities is portrayed in real time or is stored, processed and combined with other data. Various filtering and modeling processes are performed to produce certain results. Selected results are presented visually in two- or three-dimensional images of the areas in question with supporting multiple displays of relevant economic, demographic, public safety, etc. data. The data manipulation process is capable of simplifying the complex decisions attendant environmental management and the expenditure of funds necessary to accomplish complex goals. Furthermore, the process may be interactive with any geographical information system (GIS) and external databases as it is designed to integrate complex data sets and reduce these to simple two- or three-dimensional graphical presentations for decisionmakers.

It is therefore a primary object of the present invention to provide a process for collecting data pertinent to environmental conditions and correlate such data with fiscal and public health considerations.

Another object of the present invention is to provide a process for simulating certain events to determine the environmental impact of such events within a defined jurisdiction.

Still another object of the present invention is to provide a process for collecting environmentally related data, correlating same with regulatory schemes and determine compliance therewith.

Yet another object of the present invention is to provide a process for use within a specified jurisdiction for collecting environmentally related data and developing various scenarios to determine the impact upon the risk to public health of various forecastable changes of environmental conditions.

A further object of the present invention is to provide a method for developing models based upon actual and variable environmental data to determine the different effects upon public health and costs.

A still further object of the present invention is to provide a method for creating future scenarios attendant the environment based upon present collected environmental data as it may be modified by various to be made regulations.

A yet further object of the present invention is to provide a projection of the public health risk and costs for various changes to the present environment based upon real time data collected.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 4 illustrates a block diagram of the process for acquiring data, integrating the acquired data with other data, simulating scenarios based upon variable inputs, and accommodating interaction by users; and FIG. 5 illustrates a representative setting for presenting the information developed in any of several formats.

DETAILED DESCRIPTION OF THE PREFERRED EMBODIMENT

Figure 1:
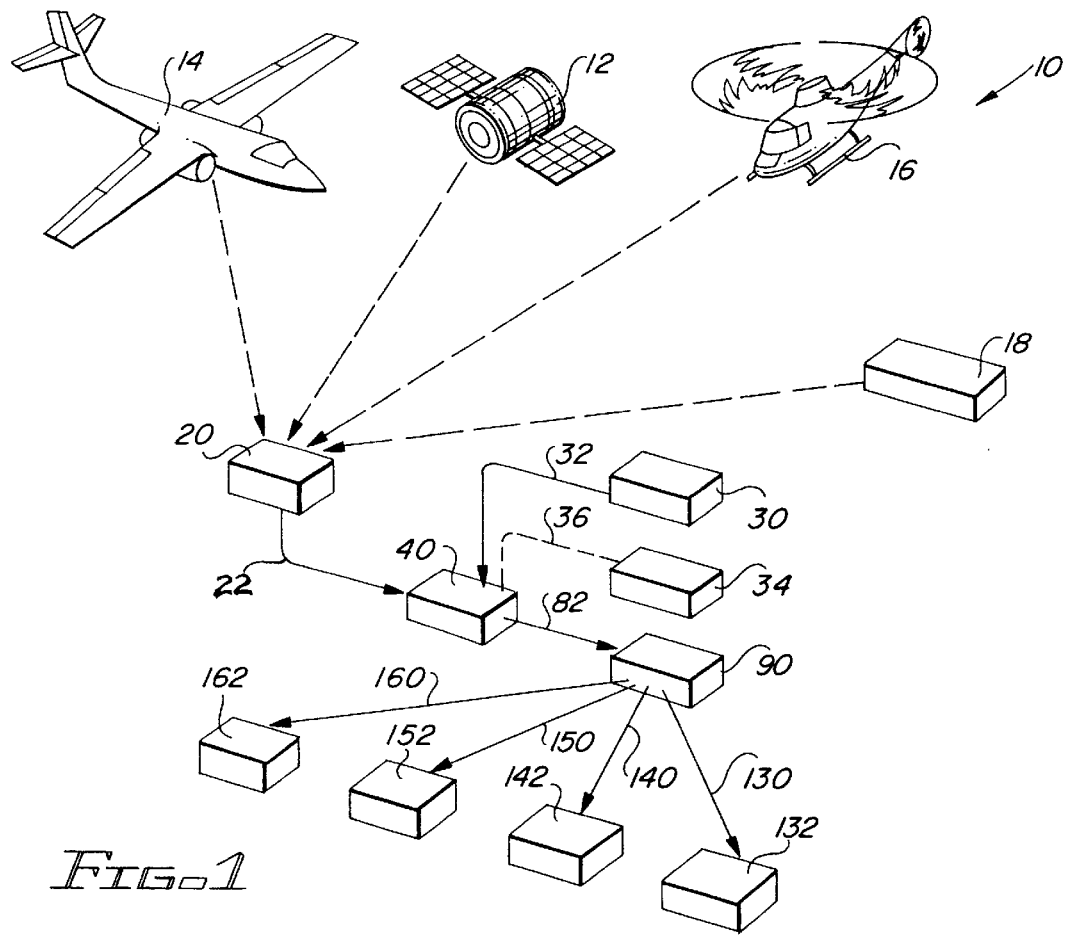
FIG. 1 is a block diagram schematically representing the information gathering and routing system.
Figure 2:
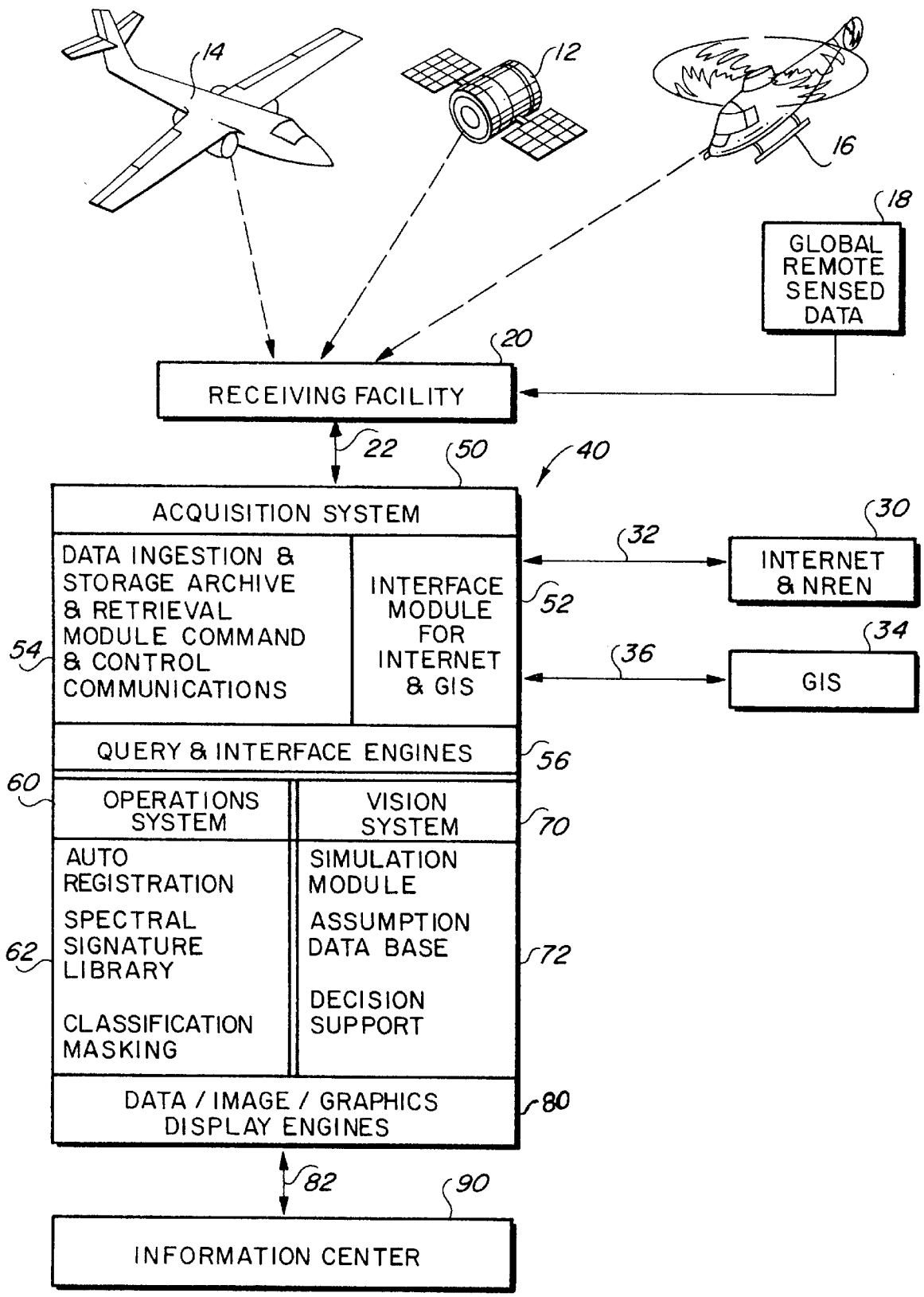
FIG. 2 is a block diagram depicting subsystems of the system shown in FIG. 1.

Referring to FIG. 1, there is shown a block diagram schematically illustrating an enhanced geographical information system 10. In particular, it illustrates the gathering of the information to be processed and the flow of the information after the gathering, including the processing and distribution of the information to ultimate users. FIG. 2 illustrates some of the hardware and software modules embodied in and broadly shown in FIG. 1. Information in any of various formats may be received by a data reception ground station 20 from several different sources. These sources may include an earth circling satellite 12, an aircraft 14, and a helicopter 16. The helicopter represents a local aircraft or an earth bound fixed sensor, such as a sensor atop a mountain or a tall building, etc., which gathers essentially local information. Aircraft 14 may be a type of reconnaissance aircraft that may cover a relatively large area for data gathering purposes. For example, aircraft 14 may provide multispectral radar, and lidar information, infrared data, photographs, and/or other information and helicopter 16 may provide primarily photographic and video information of a local area or some part or parts thereof. Satellite 12 may provide multispectral radar data, radar data, photographic information, infrared data, lidar data, sidar data and the like. There are many kinds or sources of data that are now available, and more types of sources of data will be available in the future, which are representatively depicted by satellite 12, aircraft 14, and helicopter 16. With contemporary technology, data from any of these sources may be transmitted to one or more earth stations 20.

With respect to terminology, it will be noted that multispectral data or information is generally considered as passive systems for deriving information. Radar, lidar, and sidar are typically considered active systems for deriving information from a transmitted signal reflected by an object of interest and received at a receiving station. Global remote sensed information/data, including global positioning system (GPS) and global climate change models, may be received by ground station 20. A block 18 represents the source(s) for such information/data.

The information/data gathered is transmitted from ground station 20 through appropriate transmission elements 22, such as wireless, fiberoptics, or cable elements to a central location 40. The central location includes the software and hardware necessary for processing the received information incorporated in three primary systems. These primary systems are an acquisition system 50, an operations system 60, and a vision system 70. The acquisition system includes an interface module 52 for receiving information from an Internet and a NREN station 30 through transmission line 32 and from GIS station 34 through transmission line 36. These stations provide regional and global information, respectively. The information available from Internet and NREN station 30 may come from any number of centers or sources. The data is transmitted to the interface module 52 from stations 30,34 by appropriate communications channels or transmission lines, as depicted.

Data may be received from numerous sources, as indicated above, such as from land based, airborne or space based sensor platforms, or from data libraries of various types. The data may be fed directly to central location 40 in real time or near real time. Remote sensed data, such as multi-spectral radar, lidar, and sidar, is routed to central location 40 where it is processed, manipulated, and archived. At the central station, data is routed to the appropriate hardware and software elements, as desired or required. The information represented by the data is analyzed, collated, and processed appropriately for use. The "use" may be multiple uses, depending on the users. That is, different users may desire different information, and the information is processed to provide single or multiple users with virtually any type of information from the data. The data may be retrieved, further manipulated, and presented through use of software and hardware elements in an interactive venue, such as might be designed for group decision support in a setting, such as an information center 90 illustrated in FIG. 3.

Three primary systems are integrated, as best shown in FIG. 2. One system is acquisition system 50, the second system is operations system 60, and the third system is vision or visioning system 70. Acquisition system 50 includes an interface module 52 which may interface with a generic geographic information system (GIS) station 34. Module 52 provides the interface software for subroutines with the generic GIS and the communications software for direct linkage with remote sensors. It may link continuously with several different sensor instruments on satellites or aircraft that provide selective hyperspectral scanning of the electromagnetic spectrum, radar imagery, which may be multi-polarized, and laser imagery (lidar), which may be similarly polarized. The module may then provide instantaneous or prerecorded information of value to the users. Initial processing of raw multi-spectral, real time data from aerial and space based platforms is performed within this module and it includes the hardware necessary to run the software and to facilitate data movement. After initial processing of the Internet and NREN data received from station 30 by interface module 52, the module communicates with a module 54 that provides various functions, such as data ingestion and storage, archive and retrieval, command and control, and communications relevant to the processed data.

Figure 3:
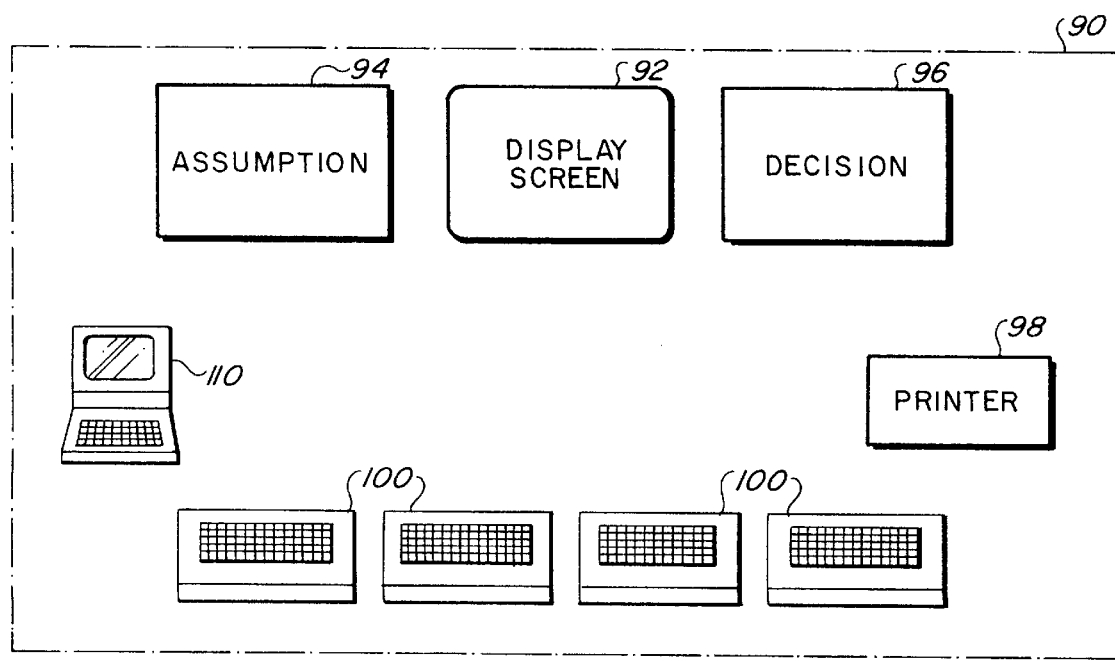
FIG. 3 is a block diagram illustrating an information center.

A plurality of direct display screens 92 may be used in information center 90 and controlled by interactive keyboards/LCD displays (consoles 100), as shown in FIG. 3. For example, a user may wish to see the aerial photography for a one mile buffer around a specific land address. The information is passed to the database query and interface engine 56 (FIG. 2) which locates the appropriate records. A unique identifier and task request is sent to block 80 wherein a graphics engine expands the geometry of the subject parcel of land for the one mile radius. Finally, the geometry of the buffer is passed to an image display engine and a data display engine which extracts only the portion of the image needed and sends the results on a transmission line 82 to a display screen 92 for display at information center 90.

Operations system 60 provides for remote sensed data transfer, manipulation, and display for current operations and user functions through software. Some of the functions include auto registration, spectral signature library, classification, and masking, as illustrated in block 62. The essential functions or sub modules for operations system 60, as listed in abbreviated form in block 62, include:

1. Automatic registration of multi-spectral, hyperspectral, radar, or lidar imagery:
    a) This module contains the subroutines necessary to automatically identify the data imagery type and to auto register, or align, this imagery or attribute information with the GIS database; and
    b) The GIS database provides known ground features to provide overall control points for rectification of the imagery. Only features with pronounced active or passive signatures, static physical characteristics and appropriate geographic locations will be identified, such as a canal, tree, vehicle, or building, etc. An algorithm then analyzes the imagery and matches the known ground control shapes, transferring the coordinate geometry of the GIS database features to the given image. This operation may be done through several correcting iterative processes by increasing the number of ground control features each time until an acceptable deviation is achieved.

2. High resolution multi-spectral, radar, and lidar imaging signature libraries:
   a) This library provides reference data for atmospheric, land surface, and subsurface features, vegetation, life forms, conditions, and attributes within any desired region, such as, for example, the southwestern United States region. This is a reference library for comparison with new remote sensed data, permitting feature identification, whether atmospheric, land surface, or subsurface;
   b) GIS registered, high resolution, multi spectral, and radar or lidar imagery is ground truthed and synthesized to build an optimal signature library. The imagery is superimposed with known features within the GIS database, such as pavement, roof tops, etc., to determine the most common signature return for the given feature;
   c) Since many factors can affect the signature return of any given feature, such as angle or pitch of the camera, shadows, etc., variances in the signature library occur. These variances are mathematically calculated to determine allowable tolerances within the signature band for each feature. Each spectral band within the spectral range for a given feature is examined for return values and optimally predictive values are calculated. This depicts the most common spectral return for the given band; and
   d) Next, tolerances are calculated by finding the minimum and maximum values in which a certain percentage of the returns for a given band belong. Finally, the signature library elements are tested and verified against or with known signatures for the region's known imagery to insure the classification accuracy of the data.

3. Classification module:
   a) This module interprets the data stream and is equipped to recognize atmospheric, surface, and subsurface constituent features and attributes by spectral signature or reflected image comparison with reference to the signature library discussed above.

4. Masking module:
   a) This module scans the data to produce an image which will present special features, such as a roof type or hydrant location, for example, and search for a given signature or indication, such as a particular pollutant, vegetation type, land characteristic, attribute, or object, or for a given coordinate set with a listing of selected attributes; and
   b) Following classification and/or masking, data are sent to the vision system or to an integrated user interface module, discussed below, for display and dissemination to a user. Data may be returned to vision system 70 repeatedly for additional processing, as desired. Geographical addressing, coordinate selection, attribute queuing, and zoom or magnification features are contained within this module.

General applications developed using vision system 70 include:

1. Environmental change monitoring, compliance, and enforcement;
2. Transportation monitoring, analysis, and planning;
3. General planning, growth assessment, and management;
4. Zoning and building code enforcement; and
5. Public protection and emergency/disaster response services.

Sample applications of this vision system include: hazardous materials dumping by type, location, and time; police (law enforcement) transit, service, utility, or other vehicle location and status; watershed status; impending weather related events; regionally coordinated disaster incident management; traffic vehicle counts by time of day and location; tracking of vehicles, biological and nonbiological objects, or other entities; transportation planning; zoning monitoring and enforcement; crime evidence gathering; development plan review and tracking; air quality analysis; sources and movement of pollutants; long term trends of various types; construction progress monitoring; and permit and other violations.

Visioning system 70 may provide dynamic visual and financial simulations of a region's future, given an assumption set and a predetermined series of development or policy decisions. It is intended to project into a long range time frame and incorporate global change data through a high speed data channel. Global data is regionalized, utilizing special subprogram software to combine emerging local climatic models with larger data sets. This subprogram accesses global environmental information data and modeling to assist a municipality in developing long term strategies which integrate with global environmental trends and emerging guidelines for sustainable development.

The following subroutines, depicted in block 72, are a part of vision system 70:

1. Simulation:
   a) Digital image manipulation and simulation capability utilizes advanced processing capabilities applied to environmental, economic, and social models developed as part of the module subroutines; and
   b) Optical image manipulation and simulation also utilizes advanced processing, but filters the image of elements not requiring update for the next image. An image library is established for a local community to use for fly through/bys and "what if" scenario generations.

2. Assumption Set and Database:
   Simulation scenarios derive from a set of assumptions, regarding, in part:
   a) Global/regional/local environmental factors (climate change, costs assigned to pollutants, new pollutants, totally internalized resource costs);
   b) Global/regional/local economic factors (rate of inflation, interest rates, sources of GNP and local incomes, new products and specification, existing material and product performance specifications, areas, tax rates); and
   c) Global/regional/local social, cultural, demographic factors (population forecasts, health costs, educational levels and provisions).

3. Decision Support Module:
   a) Simulation scenarios depend on the policy and development decisions made by a community, government, or user organization. These are categorized in this module to include likely outcomes for a variety of policies, development alternatives, and infrastructure projections with regard to cost, usage rates, and life cycle costing of materials.

This module includes group decision support software which may be user confidential and individually interactive at each user's console 100, (see FIG. 3), and at remote locations. A typical facility is depicted in FIG. 3 as information center 90 that may serve citizens, council commissions, senior management/planning meetings, etc. obviously, this facility may be adapted to various user groups or organizations requiring the integration of multiple data sets, imagery, and group decision support software.

The entire system is appropriately interconnected, such as by fiber optics, to all appropriate user departments and offices to create a virtual network that integrates across user groups. As a national "Information Highway" is developed, the system may be connected to include other, or more, remote locations.

Information center 90 includes a plurality of interactive consoles 100 connected to the central location 40 by appropriate elements. A plurality of communications lines 130, 140, 150, and 160 are illustrated in FIG. 1 as extending to different centers 132, 142, 152, and 162, respectively, where the gathered and processed information may be used by users. One such user may be information center 90, connected to the central location 40 by an appropriate transmission line 82 from data/image/graphics display engines depicted in block 80. Block 80 represents the software and hardware which interfaces with the information center 90 and the central location 40. It will be understood that the various modules, engines, etc., within the central location 40 communicate with each other as required to analyze, retrieve, etc., the data as requested by users at consoles 100 . . . 106, etc.

At the front of the information center 90, and in front of the consoles 100, may be a large display screen 92. By use of the consoles 100, the users may call up and have displayed desired information on the display screen. Moreover, the information displayed on display screen 92 may be manipulated and otherwise used or varied as desired. A master control console or facilitator console 110 is shown in FIG. 3.

Some examples of the applications available are set out below. The examples are illustrative only, and not exclusive. Different users may sit at consoles 100. Facilitator console 110 may provide assistance for the users at the consoles. Hard copies of data may be provided by a plotter or printer 98 or similar image/data rendering device, or transmitted to a playback device for later usage, as desired.

On opposite sides of the display screen 92 are an assumption screen 94 and a decision screen 96. The purpose of these screens is to aid the users in making decisions based on provided data. The assumptions may include resource, pollutant costs as a minimum in arriving at proper decisions. Decision screen 96 will display the chosen decision tree, generally regarding changes to the natural environment. The display screen 92 will display visually and dynamically the long term results of the proposed changes.

Remote centers 132, 142, 152, and 162 are shown in FIG. 1. These remote centers may represent departments, agencies, private individuals or entities, schools and universities, federal agencies, other political units, etc., tied into or part of system 10.

The following examples set forth various and representative uses that may be accommodated by system 10:

EXAMPLE NO. 1

An "old" map shows water meters and sewer manholes at specific locations on a given street. With a hand held GPS transmitter, a person may walk along the street and activate the GPS transmitter at the water meters and manholes. GIS satellites receive the transmissions and relay the coordinates of the exact locations from where the transmissions were sent. The information is processed and is used to verify the "old" information and to correct any errors. The "new" information thus received and processed provides correct location information for the various water meter and sewer manholes.

EXAMPLE NO. 2

A new subdivision is planned for a section of land which includes hills, dry water courses and certain types of desired vegetation. The section of land has been photographed, etc., and the information is in the system memory. The information on the desired section is brought up on a computer screen and the information is analyzed. Appropriate printouts may be made for detailed analysis. The information provided includes details on the vegetation so that lot lines, roads, etc., may be plotted to have minimum adverse effect on the vegetation and on the natural water courses, etc.

EXAMPLE NO. 3

Aerial photographs of an area are processed with maps to show correct lot boundaries, misaligned walls and fences, and other desired information.

EXAMPLE NO. 4

Radar imagery is preprocessed and auto registered to a GIS mapping system which overlays parcel property lines. The resulting image can be automatically interpreted or "read" to determine the surface area and percent slope on any given ownership parcel. This yields buildable/unbuildable percentages and ultimately derives a slope analysis for the parcel. These parcels, and their attributes, can be aggregated to provide a basis for transaction negotiations, tax assessment, and other values which are slope dependent. The radar data provides highly accurate elevation data from the which the slope composite imagery is constructed.

EXAMPLE NO. 5

An agency responsible for reviewing, revising, approving, monitoring construction progress, and otherwise dealing with land use and architectural plans may require these to be submitted in computer assisted design (CAD) format on magnetic or optical media. Plans thus digitized may be merged into the GIS resident, remote sensed imagery to create dynamic, three-dimensional and realistic presentations of the finished development of a capital improvement project. The simulation software merges the digitized plan with change models and simulates visually how the project will look in the distant future. Plan check submodules approve, or disapprove the project based on its long term impacts as determined by this simulation capability.

EXAMPLE NO. 6

The visual simulations set forth in Example 5, above, may be integrated with economic, social, and environmental cost forecasts to determine a project's impact on the sustainability of the community, or ability to function without negatively impacting the future wellbeing of the community.

EXAMPLE NO. 7

A developer's plans are submitted on electronic optical or magnetic media and integrated with existing regulatory data and video of the proposed area to 1) verify plan compliance with city/state/federal codes, and 2) simulate how the proposed project, if built, would appear and impact the community in the distant future.

EXAMPLE NO. 8

City planners utilize the system to design and update the city's land use plan. Transportation planners, storm water planners, etc., will visualize the land use plan concurrently during the design phase and assess impacts of the plan with regard to transportation, storm water, etc. Recommendations and manipulations can be made by the transportation planner and the impact of such recommendations and manipulations can be visualized in three-dimensions. This process allows for group interaction in city planning through the integration of existing city models and the visualization of model inputs and outputs.

Environmental concerns are relatively new to most local and regional jurisdictions and coping with regulatory requirements has presented unique difficulties. Because environmental considerations are at an embryonic stage, the applicability and pertinence of data collected is suspect for any area removed from the data site collection. Technology presently exists for remediating most environmental concerns. However, lack of historical experience with environmentally induced damage has rendered it difficult to correlate remedial efforts with fiscal considerations. Moreover, information to assist in correlating the beneficial environmental effects with remediation procedures in view of the fiscal impediments is severely wanting.

Referring to FIG. 4, there is shown a block diagram of the process for developing environmentally related data and correlating same with other data. Moreover, the process will monitor the environment and includes the capability to create visually perceivable images, as well as documentation, of environmental concerns attendant a given area. The process will also provide the capability for projecting changes to the environment as a result of varying the data as a function of remedial measures that could be taken. Since long term projections are of significance to justify fiscal costs, changes of the environment under consideration can be projected as a function of time. The images that are portrayable may be in two dimensions or in three dimensions to provide decisionmakers with readily understandable consequences of various actions that could be taken as part of remediation or curative processes.

Block 170 represents real time and/or stored environmental remote sensed data for the area of interest. The real time remote sensed sources of data may be land, aircraft, or satellite based platforms, as described above with respect to FIGS. 1 and 2. These platforms may provide multispectral, hyperspectral, radar and/or lidar data that defines atmospheric, surface, and subsurface conditions. This data may also define the health of the environment as a function of the presence or absence of certain elements known to be of significant influence. The data may be stored after acquisition by known remote sense technologies for subsequent use. Block 172 represents a database containing historical data to the extent it may be available. The historical data may be acquired from extant records. As such, it may be inputted manually due to the paucity of automatic transfer and acquisition capability of such data. Block 174 represents federal and any regional or local requirements in the form of statutes, rules, and regulations pertinent to the area of interest. The regulatory requirements are essentially dynamic and only the most recent pertinent regulations would be used. Block 176 represents geographical information system (GIS) data available for the area of interest. Such data could be developed as described above with respect to FIGS. 1 and 2. Block 176 also represents a module for interfacing the GIS data with other sources of data. The GIS data pertains to land use and land cover and can be used directly or for comparative purposes. By incorporating the comparison mode, certain uncertainties of the remote sensed data may be resolved.

Module 180 is a processing module that will provide a digital model of environmental conditions of concern. In particular, it will integrate environmental data with financial and impact assessment data. Furthermore, the module will interpret input data from one or more of blocks 170, 172, 174, and 176 and preprocess the data for use by further modules. The module will also interpret the result of environmental input data as a function of the allowable limits defined by the regulatory requirements contained in block 174. The historical and GIS data is available to this module for the preparation of two- and three-dimensional maps showing pollution type, location, and density. This module will interface with a simulation module 182.

The simulation module will provide a variety of environmental scenarios based on a variety of hypothetical pollutant levels or pollution generating activities over a period of time. Module 182 contains algorithms which relate specific activities to specific pollution levels. These pollution levels will be related to a variety of cost scenarios, which costs are a function of both fiscal costs and health-related costs. Thus, the relationship of activities to costs can be varied to determine outcomes for a range of decision options. These variables may be created by software icon sliders that drive algorithms relating to the pertaining variables.

Decision support module 184 provides assistance to decisionmakers by using interactive computer terminations which permit individuals to select a number of activities or pollutants of concern for a given geographic area. A ranking is assigned to each of these activities or pollutants. Selected levels of funding can also be introduced. These various inputs are combined by module 184 to provide data for presenting a visually perceivable image which is changeable as a function of selected variables. The module may also contain an electronic record of identified issues, recommendations made, nature of vote taken, and final decision by a group or a decisionmaker.

Visualization module 186 is in communication with the databases and the modules discussed above. Moreover, it includes an interface capability for interfacing with one or more users, as represented by block 188. Based upon queries or requests made by users, visualization module 186 is capable of portraying two- and three-dimensional images upon one or more screens to provide readily comprehensible images of present conditions, modifications that would result from change of one or more variables and projections of changes that would come about with the passage of a defined time period(s). Additionally, pertinent data may be displayed to provide numerically based information along with pertinent commentaries and/or caveats.

Referring to FIG. 5, there is illustrated a facility 200 for presenting environmentally related information pertinent to the present time, a future time, and modifications thereto that would occur as a function of changes in one or more variables. Moreover, interaction between multidisciplines will correlate compliance with regulatory requirements, health concerns and costs. The facility includes an area 202 for speakers and displays relating to environmental concerns at issue. A presentation area, represented by block 204, includes a plurality of visually perceivable screens for displaying two- and three-dimensional images depicting the geographic areas of interest superimposed with environmental considerations under investigation. An area 206 is set aside for supporting staff to perform its functions. Technical support for real time data presentation may be located in a further area 208 to provide not only answers to inquiries made by the staff but to also ensure that the presentations made are technically appropriate and accurate.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method for monitoring the environment by collecting data and presenting data that may be converted to a visually perceivable or to a documentary format, said method comprising the steps of:
    (a) acquiring factual natural and man-made environmental information on a real time basis;
    (b) identifying subject matter of the real time factual information;
    (c) ingesting and storing the identified factual information;
    (d) retrieving pre-existing factual environmental information of selected subject matter from a source;
    (e) correlating selected ingested information with corresponding retrieved information;
    (f) compiling the correlated information;
    (g) analyzing the compiled information to obtain simulation scenarios of the impact upon the environment due to either actual or anticipated variations of the factual information; and
    (h) selectively presenting the compiled or analyzed information for review and study.

2. The method as set forth in claim 1 including the step of deleting any retrieved information commensurate with any ingested information to render most current the correlated information.

3. The method as set forth in claim 1 including the step of simulating the environment in at least one future time period based upon the ingested and the retrieved information.

4. The method as set forth in claim 1 wherein said step of retrieving includes the step of using the retrieved environmental information and the ingested information to develop simulated environmental information in a predetermined time period.

5. The method as set forth in claim 1 wherein said step of presenting includes the step of imaging a selected one of the compiled information and the simulation scenarios in a visually perceivable format.

6. The method as set forth in claim 1 wherein said step of presenting includes the step of displaying the compiled information in more than one format.

7. The method as set forth in claim 1 wherein said step of correlating includes the step of creating different combinations of the ingested information and the retrieved information and wherein said step of compiling produces a plurality of compilations of information.

8. The method as set forth in claim 7 wherein said step of presenting includes presentation of the plurality of compilations.

9. The method as set forth in claim 1 wherein said step of presenting includes the step of displaying the projections resulting from said step of analyzing.

10. The method as set forth in claim 9 wherein said step of displaying includes the step of displaying the projections in more than one format.

11. The method as set forth in claim 1 including the step of simulating the effect upon the compiled information as a result of varying the factual information.

12. A method for collecting natural and man-made information relating directly and indirectly to the environment, said method comprising the steps of:
    (a) acquiring factual natural and man-made environmental information on a real time basis;
    (b) identifying subject matter of the real time factual information;
    (c) retrieving pre-existing factual environmental information of selected subject matter from a source;
    (d) correlating selected identified information with corresponding retrieved information;
    (e) analyzing the correlated information to obtain simulation scenarios of the impact upon the environment due to either actual or anticipated future variations of factual information; and
    (f) selectively presenting the correlated and analyzed information.

13. The method as set forth in claim 12 wherein said step of correlating includes the step of replacing the retrieved information with corresponding acquired information to present up-to-date factual information.

14. The method as set forth in claim 12 wherein said step of correlating includes the step of compiling the correlated information in more than one time period.

15. The method as set forth in claim 13 wherein said step of correlating includes the step of compiling the correlated information in more than one time period.

16. The method as set forth in claim 12 wherein said step of presenting includes the step of imaging a selected one of the correlated information and the simulation scenarios in a visually perceivable format.

17. The method as set forth in claim 12 wherein said step of presenting includes the step of displaying the correlated information.

18. The method as set forth in claim 12 wherein said step of presenting includes the step of displaying the projections resulting from said step of analyzing.

19. The method as set forth in claim 18 wherein said step of displaying includes the step of displaying the projections in more than one format.

20. The method as set forth in claim 12 including the step of simulating the effect upon the correlated information as a result of varying the factual information.

21. A method for projecting the effect on the environment resulting from varying collected natural and man-made environmental information, said method comprising the steps of:
    (a) acquiring factual natural and man-made environmental information on a real time basis;
    (b) identifying subject matter of the real time factual information;
    (c) ingesting and storing the identified factual information;
    (d) retrieving pre-existing factual environmental information of selected subject matter from a source;
    (e) correlating selected ingested information with corresponding retrieved information;

(f) varying selected parameters of the ingested factual information;

(g) compiling the correlated information and the varied information;

(h) analyzing the compiled information to obtain simulation scenarios of the impact upon the environment resulting from the selected variations of the factual information; and (i) presenting the analyzed simulation scenarios of the environment for review and study.

22. A method for projecting the effect on the environment resulting from varying collected natural and man-made environmental information, said method comprising the steps of:

(a) acquiring factual natural and man-made environmental information on a real time basis;

(b) identifying subject matter of the real time factual information;

(c) ingesting and storing the identified factual information;

(d) retrieving pre-existing factual environmental information of selected subject matter from a source;

(e) correlating selected ingested information with corresponding retrieved information;

(f) varying selected parameters of the acquired factual information;

(g) compiling the correlated information and the varied information;

(h) analyzing the compiled information to obtain simulation scenarios of the impact upon the environment resulting from the selected variations of the factual information; and (i) presenting the analyzed simulation scenarios of the environment for review and study.

23. A method for projecting the effect on the environment resulting from varying collected natural and man-made environmental information, said method comprising the steps of:

(a) acquiring factual natural and man-made environmental information on a real time basis;

(b) retrieving pre-existing factual environmental information of selected subject matter from a source;

(c) correlating selected identified information with corresponding retrieved information;

(d) varying selected parameters of the retrieved factual information;

(e) analyzing the correlated information to obtain simulation scenarios of the impact upon the environment resulting from the selected variations of factual information; and (f) presenting the analyzed simulation scenarios of the environment.

24. A method for projecting the effect on the environment resulting from varying collected natural and man-made environmental information, said method comprising the steps of:

(a) acquiring factual natural and man-made environmental information on a real time basis;

(b) retrieving pre-existing factual environmental information of selected subject matter from a source;

(c) correlating selected identified information with corresponding retrieved information;

(d) varying selected parameters of the acquired factual information;

(e) analyzing the correlated information to obtain simulation scenarios of the impact upon the environment resulting from the selected variations of factual information; and (f) presenting the analyzed simulation scenarios of the environment.

* * * * *